United States Patent
Lotinsky et al.

(10) Patent No.: US 10,955,999 B2
(45) Date of Patent: Mar. 23, 2021

(54) CONTROLLED CONTENT PRESENTATION OF OBJECTS ON A CANVAS IN A BROWSER ACCORDING TO A GRID

(71) Applicant: LearnZillion, Inc., Washington, DC (US)

(72) Inventors: Ian Michael Lotinsky, Clarksburg, MD (US); Heather Anne Finn, Arlington, VA (US); Ian Phelan Lukens, Rockville, MD (US); Ronald Glen Warholic, Derwood, MD (US); Elizabeth Johanna Swanson McHugh, Washington, DC (US)

(73) Assignee: LearnZillion, Inc., Washington, DC (US)

( * ) Notice: Subject to any disclaimer, the term of this patent is extended or adjusted under 35 U.S.C. 154(b) by 25 days.

(21) Appl. No.: 15/840,679

(22) Filed: Dec. 13, 2017

(65) Prior Publication Data

US 2019/0163330 A1    May 30, 2019

Related U.S. Application Data

(66) Substitute for application No. 62/592,239, filed on Nov. 29, 2017.

(Continued)

(51) Int. Cl.
*G06F 9/48*       (2006.01)
*G06F 3/0483*    (2013.01)
(Continued)

(52) U.S. Cl.
CPC ........ *G06F 3/0483* (2013.01); *G06F 3/04842* (2013.01); *G06F 3/04845* (2013.01);
(Continued)

(58) Field of Classification Search
CPC ...... G06F 3/0483; G06F 4/109; G06F 40/166; G06F 40/106; G06F 3/04842;
(Continued)

(56) References Cited

U.S. PATENT DOCUMENTS 6,008,807 A  * 12/1999  Bretschneider ....... G06F 3/0485
                                                                  715/732
7,576,756 B1 *  8/2009  Good .................... G06F 3/0481
                                                                  345/635

(Continued)

OTHER PUBLICATIONS

Aleckson, "Web-Based Authoring Tools for Scalable eLearning Development: The Time Has Come", http://webcourseworks.com/web-based-authoring-tools-for-scalable-elearning-development/, May 12, 2015. (Year: 2015).*

(Continued)

*Primary Examiner* — Jennifer N To
*Assistant Examiner* — K C Chen
(74) *Attorney, Agent, or Firm* — Shami Messinger, PLLC

(57) ABSTRACT

Methods and systems are provided for improved authoring of instructional content. A browser and an online application provides a presentation controller and an editor. The presentation controller controls presentation of objects to an author of instructional content. The editor allows the author to edit presentation of objects. In an embodiment, the presentation controller and editor are automatically provided to the browser when a user accesses the online application.

10 Claims, 13 Drawing Sheets

Related U.S. Application Data

(60) Provisional application No. 62/592,952, filed on Nov. 30, 2017.

(51) Int. Cl.
*G06F 3/0484* (2013.01)
*G06T 13/80* (2011.01)
*G06T 11/60* (2006.01)
*G06F 40/106* (2020.01)
*G06F 40/109* (2020.01)
*G06F 40/166* (2020.01)

(52) U.S. Cl.
CPC .......... *G06F 40/106* (2020.01); *G06F 40/109* (2020.01); *G06F 40/166* (2020.01); *G06T 11/60* (2013.01); *G06T 13/80* (2013.01); *G06F 2203/04803* (2013.01); *G06T 2200/24* (2013.01)

(58) Field of Classification Search
CPC ....... G06F 3/04845; G06F 2203/04803; G06T 11/60; G06T 13/80; G06T 2200/24
See application file for complete search history.

(56) References Cited

U.S. PATENT DOCUMENTS

| | | | |
|---|---|---|---|
| 7,788,579 B2* | 8/2010 | Berkner | G06F 40/106 715/243 |
| 8,434,002 B1* | 4/2013 | Shah | G06F 17/212 715/200 |
| 8,826,117 B1* | 9/2014 | Junee | G11B 27/034 715/230 |
| 10,163,173 B1* | 12/2018 | McKinley | G06F 3/0484 |
| 10,282,069 B2* | 5/2019 | Ilic | G06F 40/106 |
| 2001/0021937 A1* | 9/2001 | Cicchitelli | G09G 5/00 715/269 |
| 2002/0191013 A1* | 12/2002 | Abrams | G06F 9/543 715/730 |
| 2003/0163784 A1* | 8/2003 | Daniel | G06F 17/21 715/200 |
| 2004/0145593 A1* | 7/2004 | Berkner | G06T 11/60 345/619 |
| 2004/0153509 A1 | 8/2004 | Alcorn et al. | |
| 2006/0242557 A1* | 10/2006 | Nortis, III | G06F 40/14 715/234 |
| 2008/0209327 A1* | 8/2008 | Drucker | G06F 9/542 715/733 |
| 2009/0228572 A1* | 9/2009 | Wall | G06F 16/4393 709/218 |
| 2009/0325142 A1 | 12/2009 | Beavers et al. | |
| 2010/0077328 A1* | 3/2010 | Berg | G06F 3/0481 715/764 |
| 2010/0169784 A1* | 7/2010 | Weber | G11B 27/034 715/731 |
| 2010/0235769 A1* | 9/2010 | Young | G06F 9/451 715/764 |
| 2010/0313140 A1* | 12/2010 | Bank | G06F 3/00 715/747 |
| 2011/0012929 A1* | 1/2011 | Grosz | G06K 9/6267 345/661 |
| 2011/0167353 A1* | 7/2011 | Grosz | G06F 3/14 715/738 |
| 2012/0192106 A1* | 7/2012 | Kieft | G06Q 10/10 715/800 |
| 2012/0206496 A1* | 8/2012 | Cok | G06Q 10/00 345/672 |
| 2012/0206771 A1* | 8/2012 | Cok | H04N 1/00167 358/1.18 |
| 2012/0257842 A1* | 10/2012 | Tian | G06K 9/3233 382/294 |
| 2013/0254656 A1* | 9/2013 | Florian | G06F 17/2288 715/255 |
| 2013/0309648 A1 | 11/2013 | Park et al. | |
| 2014/0101152 A1* | 4/2014 | Chen | G06F 16/50 707/736 |
| 2014/0281852 A1* | 9/2014 | Wolfram | G06F 17/24 715/202 |
| 2014/0289241 A1* | 9/2014 | Anderson | G06F 16/48 707/736 |
| 2014/0298218 A1* | 10/2014 | Gera | G06F 40/186 715/765 |
| 2015/0007064 A1* | 1/2015 | Givoni | G06F 16/958 715/760 |
| 2015/0177925 A1* | 6/2015 | Villaron | G06F 3/0482 715/771 |
| 2015/0187223 A1 | 7/2015 | Kapoor et al. | |
| 2015/0193383 A1* | 7/2015 | Rao | G06F 40/186 715/243 |
| 2015/0199350 A1* | 7/2015 | Raman | G06F 16/4393 715/202 |
| 2015/0206446 A1* | 7/2015 | Gupta | G09B 5/08 434/362 |
| 2015/0242374 A1* | 8/2015 | Kong | G06F 40/106 715/201 |
| 2015/0286376 A1* | 10/2015 | Tijssen | G06F 3/04842 345/474 |
| 2016/0034434 A1 | 2/2016 | Guerrier et al. | |
| 2016/0092084 A1* | 3/2016 | Dyar | G06F 3/0481 715/765 |
| 2016/0092091 A1* | 3/2016 | Hanson | G06F 40/106 715/763 |
| 2016/0253912 A1* | 9/2016 | Heilman | G09B 5/08 434/309 |
| 2016/0267700 A1* | 9/2016 | Huang | G06F 40/166 |
| 2016/0292133 A1* | 10/2016 | Elings | G06F 40/106 |
| 2017/0154022 A1* | 6/2017 | Wang | G06F 3/0484 |
| 2017/0316091 A1* | 11/2017 | Edge | G06F 17/21 |
| 2018/0300020 A1* | 10/2018 | Dyar | G06F 3/0481 |
| 2019/0114047 A1* | 4/2019 | Kikin-Gil | G06T 11/60 |

OTHER PUBLICATIONS

Berking, "Choosing Authoring Tools—Advanced Distributed Learning (ADL) Initiative", version 9.5.7, Jul. 7, 2016. (Year: 2016).*
Campbell et al., "Learning Content Management Systems: When Business Considerations and Pedagogy Collide", Proceedings of the 2008 Annual Convention of the Association for Educational Communications and Technology (AECT), vol. 2, pp. 235-239, 2008. (Year: 2008).*
"Connposica 5.0—Social e-Learning Authoring", Composica Ltd., pp. 1-157, 2010. (Year: 2010).*
Daugherty, "21 Top Presentation Tools for Teachers", http://morethanatech.com/2015/07/21/21-top-presentation-tools-for-teachers/, Jul. 21, 2015. (Year: 2015).*
Fisher, "7 Cloud Based Authoring Tools Compared", http://elearningindustry.com/7-cloud-based-authoring-tools-compared, Oct. 27, 2015. (Year: 2015).*
Gosha, "Top 5 Web-based Presentation Tools Compared", http://www.sitepoint.com/top-5-web-presentation-tools-compared/, Nov. 11, 2014. (Year: 2014).*
Griffith, "The best free presentation software and other alternatives to Microsoft PowerPoint", http://www.itproportal.com/2014/02/19/the-best-free-presentation-software-and-other-alternatives-to-nnicrosoft-powerpoint/, Feb. 19, 2014. (Year: 2014).*
Kaur, "Collaborative Authoring Tools: All You Want to Know!", http://elearningindustry.com/collaborative-authoring-tools-all-want-know, Apr. 26, 2017. (Year: 2017).*
Pappas, "The Ultimate List of Cloud-Based Authoring Tools", http://elearningindustry.com/the-ultimate-list-of-cloud-based-authoring-tools, Mar. 12, 2013. (Year: 2013).*
Antoniou et al., "A Semantic Web Primer," Second Edition, 2008, The MIT Press, Massachusetts Institute of Technology, Table of Contents and Preface, pp. vii-xxi, Chapter 1, pp. 1-23, and Applications E-Learning Section 6.8, pp. 207-210.
Feigenbaum et al., "The Semantic Web in Action," Scientific American, vol. 297, Dec. 2007, pp. 90-97.

(56) References Cited

OTHER PUBLICATIONS

Garsiel et al., "How Browsers Work: Behind the Scenes of Modern Web Browsers," Aug. 5, 2011, available at http://taligarsiel.com/Projects/howbrowserswork1.htm; 57 pages.

Krejci et al., "YouFlow Microblog Improving Learning with the Tree Discourse Structure and Lesson Plan-Based Messages Categorization," Interactive Technology and Smart Education, vol. 11, No. 1, 2014, pp. 2-14.

Kurilovas et al., "Web 3 .0—Based Personalisation of Learning Objects in Virtual Learning Environments," Computers in Human Behavior, vol. 30, 2014, pp. 654-662.

Saad et al., "Effectiveness of a Case-Based System in Lesson Planning," Journal of Computer Assisted Learning, John Wiley & Sons Ltd, 2014, pp. 408-424, doi: 10.1111/jcal.12053.

Stott et al., "Using Interactive Virtual Field Guides and Linked Data in Geoscience Teaching and Learning," Geoscience Research and Education: Teaching at Universities, Innovations in Science Education and Technology, vol. 20, 2014, pp. 163-188.

\* cited by examiner

CONTROLLED CONTENT PRESENTATION OF OBJECTS ON A CANVAS IN A BROWSER ACCORDING TO A GRID

BACKGROUND

Technical Field

The field relates to browsers and rendering of content in browsers.

Background

Educators use electronic lesson plans, slideshow presentations, multimedia players, and document viewers to facilitate instruction. Many of these techniques or tools require knowledge of different types of applications to author content. This increases the burden on educators that create electronic content. For example, an author may have to know how to use a word processing application to create text, a photo editor to create an image, a slideshow presentation application to create slides or a movie application to create video.

These difficulties are compounded in an instructional context. Educators often wish to employ different types of objects to teach a particular lesson or meet an educational goal. These objects can involve text, images, video, audio, or other digital data used in instruction. For example, a teacher may use to use a video file to illustrate a history event and add accompanying text to underscore the concept or aim of the lesson. Many applications however are designed for expert users and make it hard to accommodate different types of objects. These applications generally use a "blank page" design paradigm. In this paradigm, an author is presented with a blank page when creating a new file. Significant expertise is then required on the part of an educator to author a new document with different objects and an effective layout.

For example, consider a teacher that wishes to create a lesson with different objects, a word processing application may present a new blank document. The teacher must then have detailed knowledge of the word processing application to insert objects, arrange a layout of the objects on one or more pages, and adjust and set styles for text and sizing for images. This burden is increased in an instructional context where a teacher must consider not just editing from an author perspective but also must account for how the document will be presented and viewed by students.

Browsers are also increasingly used with online applications to author content. A user can direct their browser to an online application. The browser is then provided with logic and data that supports the online application functions. For example, a user may browse to a GOOGLE DOCs application and then author content on a page provided on his or her browser by the GOOGLE DOCs application. In some cases, an online application may allow multiple users to edit a common document. However, these online applications often follow the same limited blank page paradigm or require expert knowledge of the application features as applications that run locally on a machine. This makes them unsuited for an instructional context where a number of different educators with varying experience and skills need to author content with different types of objects.

BRIEF SUMMARY

Methods and systems are provided for improved authoring of instructional content. In an embodiment, a browser and an online application provides a presentation controller and an editor. The presentation controller controls presentation of objects to an author of instructional content. The editor allows the author to edit presentation of objects. In one example, the presentation controller and editor are automatically provided to the browser when a user accesses the online application.

In a further feature, the presentation controller automatically places objects selected by the author through a user interface of the browser onto a canvas for display. In one feature, the presentation controller automatically places objects on the canvas and determines a size for each object based on the number of objects and the content type of the objects. In a further feature, the presentation controller determines a grid for the canvas having multiple regions and automatically places objects on the canvas according to the determined grid based on the number of objects and the content type of the objects. In a still further feature, the presentation controller automatically determines spacing between each object. Further features of the presentation controller may include automatically determining a font style and size for text in an object, and automatically determining a frame size for video or an image in an object.

In another embodiment, the online application in communication with the browser provides a view mode and an edit mode. In the view mode, the presentation controller controls presentation of objects to a user of instructional content. In the edit mode, the editor allows the author to edit presentation of objects by the presentation controller.

Further embodiments, features, and advantages of the invention, as well as the structure and operation of the various embodiments of the invention are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

New tools and methods to provide online authoring of instructional content in a browser are described.

Embodiments refer to illustrations described herein with reference to particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Browser Side Content Authoring with Presentation Controlled Canvas

Figure 1:
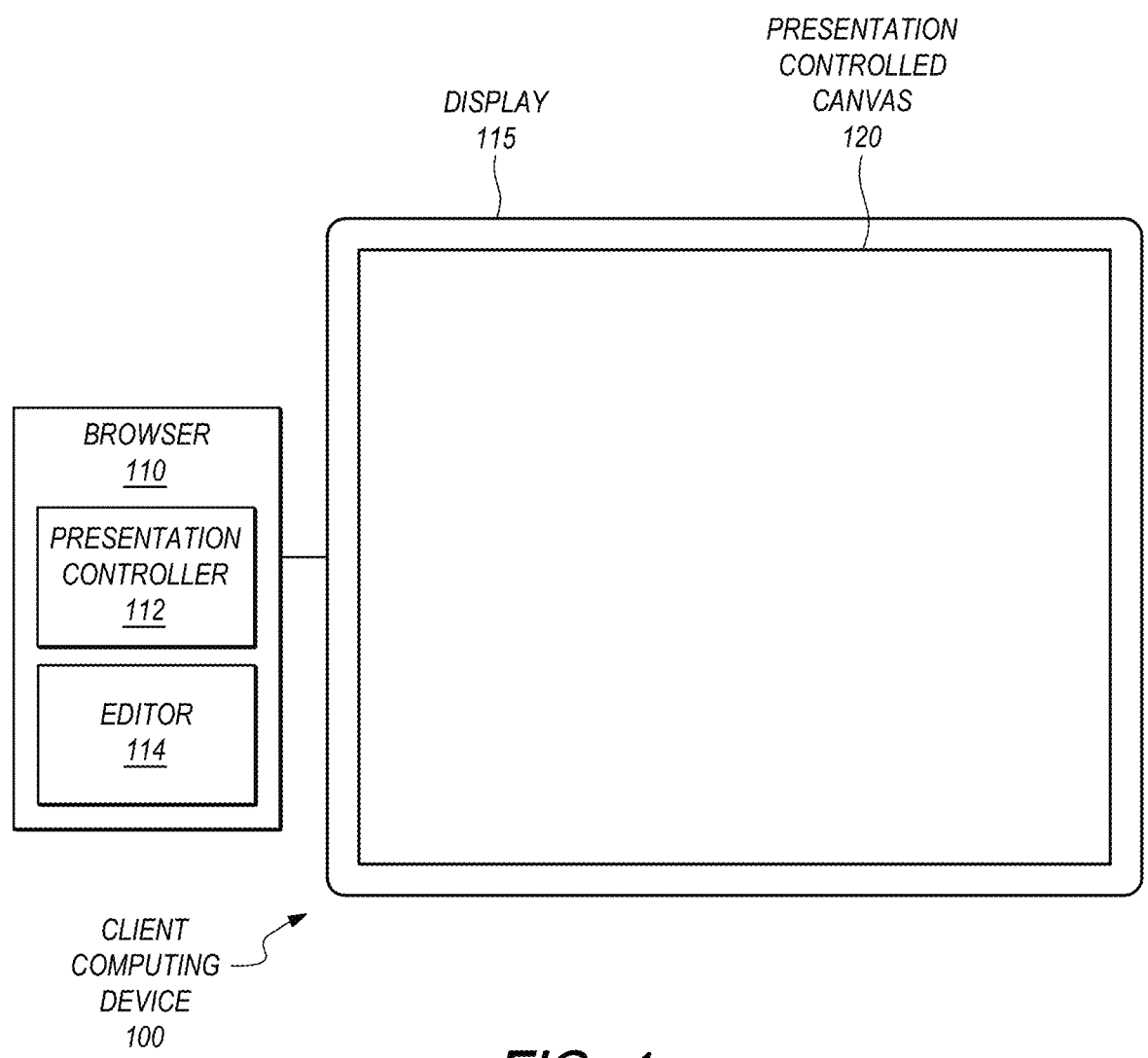
FIG. 1 is a diagram of a browser having a presentation controlled canvas in accordance with an embodiment.

As shown in FIG. 1, in an embodiment a client computing device 110 includes a browser 110 and display 115. Browser 110 includes a presentation controller 112 and editor 114. Display 115 includes a presentation controlled canvas 120. Presentation controlled canvas 120 is an area of display 115 where objects are laid out and presented under the control of presentation controller 112.

In an embodiment, presentation controller 112 controls presentation of objects to an author of instructional content. Editor 114 allows the author to edit presentation of objects. In one example, presentation controller 112 automatically places objects selected by the author through a user interface of browser 110 onto canvas 120 for orderly and beautiful display on display 115. In one embodiment, content in objects can be curriculum content used in lesson plans, assignments and other educational applications. In this way, instructional content made up of different objects can be authored and edited by teachers easily and presented to the teachers in an orderly and beautiful fashion during authoring and editing.

In one embodiment, browser 110 provides a view mode and an edit mode to an author. In the view mode, presentation controller 112 controls presentation of objects to a user of instructional content. The user can be any consumer of content including but not limited to the author of the content or any teacher or student viewing the content. In the edit mode, editor 114 allows the author to edit presentation of objects by presentation controller 112 on canvas 120.

Presentation controller 112 may handle different types of objects differently depending on a particular content block and the type and size of content. In one feature, presentation controller 112 automatically places objects on canvas 120 and determines a size for each object based on the number of objects and the content type of the objects and available canvas space. In a further feature, presentation controller 112 determines a grid for canvas 112 having multiple regions and automatically places objects on canvas 120 according to the determined grid based on the number of objects and the content type of the objects. Presentation controller 112 may also automatically determine spacing between each object. Depending on the type of object, presentation controller 112 may automatically determining a font style and size for text in an object, and automatically determining a frame size for video or an image in an object.

In one example, presentation controller 112 and editor 114 are automatically provided to browser 110 when a user accesses an online application. This can include the online application providing appropriate logic and data to browser 110 to configure the rules and operation of the browser to display content for presentation as described herein. For example, smart design defaults and logic to ensure solid visual and interaction design principles are followed. The principles are followed to guide placement of content components on a canvas, set margins to adjacent content blocks, and impose restrictions on amount of content that reside on the canvas. Each piece of content resides in a content block that in turn renders content with intelligent defaults and behavior. Further description and examples of the controlled content presentation are provided below.

Browser 110 can be any browser that allows a user to retrieve, present and/or traverse information, such as objects (also called information resources), on the World Wide Web. For example, an object or information resource may be identified by a Uniform Resource Identifier (URI) or Uniform Resource Locator (URL) that may be a web page, text, image, video, audio or other piece of content. Hyperlinks can be present in information resources to allow users to easily navigate their browsers to related resources. Navigation or other control buttons can also be provided to allow a user to further control viewing or manipulation of resources.

In embodiments, browser 110 can be a commercially available web browser, such as, a CHROME browser available from Google Inc., an EDGE browser (or Internet Explorer) browser available from Microsoft Inc., a SAFARI browser available from Apple Inc., or other type of browser, which is further configured to include presentation controller 112 and editor 114 as described herein.

Client computing device 100 can be any electronic computing device that can support a browser 110. A user can enter control inputs to browser 110 through a user interface (such as a keyboard, microphone, or touchscreen) at client computing device 100. For example, client computing device 100 can include, but is not limited to, a desktop computer, laptop computer, set-top box, smart television, smart display screen, kiosk, a mobile computing device (such as a smartphone or tablet computer), or other type of computing device having at least one processor and memory. In addition to at least one processor and memory, such a computing device may include software, firmware, hardware, or a combination thereof. Software may include one or more applications and an operating system. Hardware can include, but is not limited to, a processor, memory and user interface display or other input/output device.

Display 115 can be any one or more display units (such as a monitor, touchscreen or other display screen) that provides visual, audio, tactile and/or other sensory display to accommodate different types of objects as desired. The area of canvas 120 can be any region or more than one region within display 115. Display 115 is not limited to a single display unit and can be multiple display units coupled to client computing device 100.

Online Application and Browser Side Content Authoring

Figure 2:
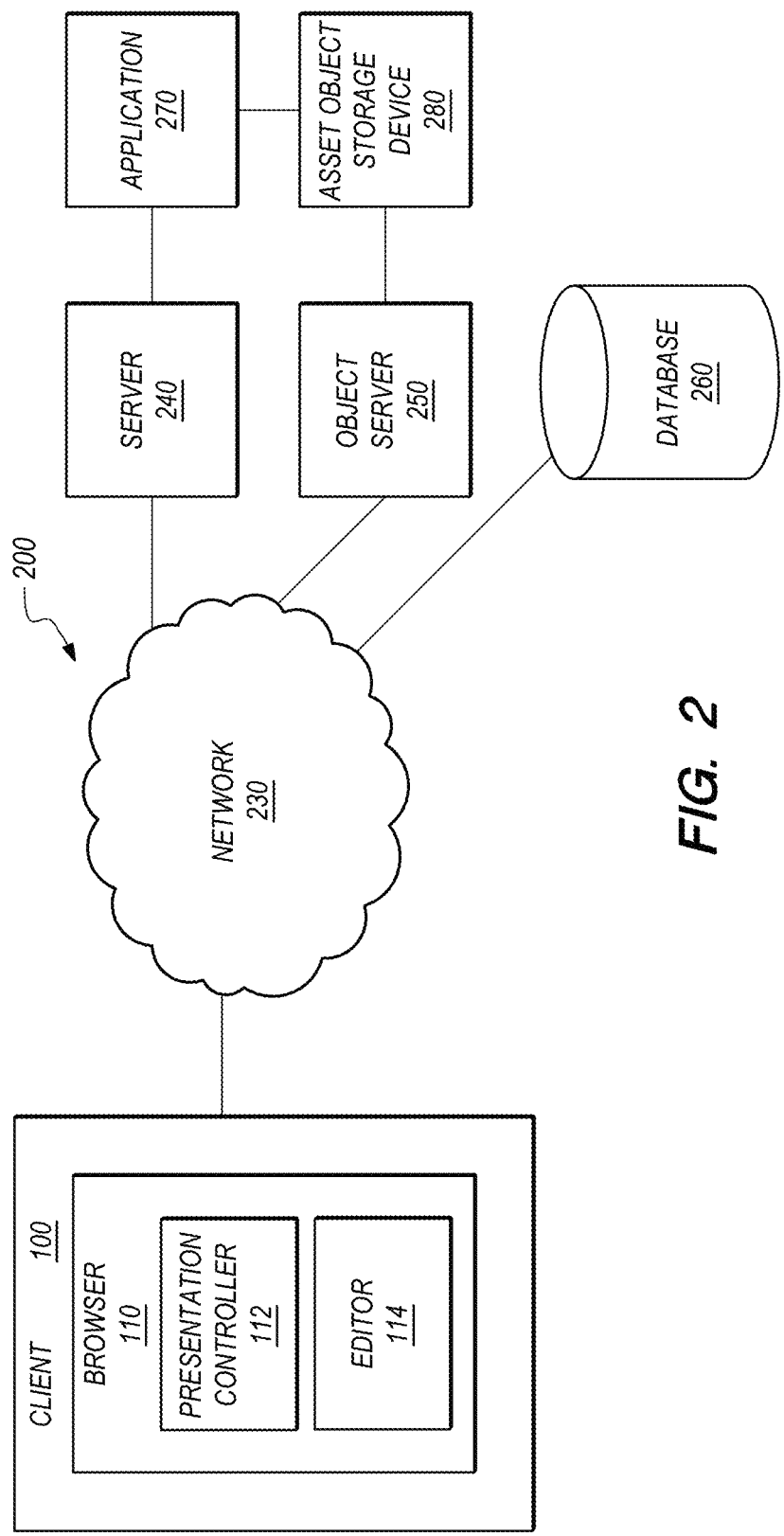
FIG. 2 is a diagram of a computer networked system that supports a browser having a presentation controlled canvas in accordance with a further embodiment.

In one embodiment, browser 110 can be used in a computer network as part of an online service. FIG. 2 shows a computer networked system 200 for controlling presentation of education content on a display of browser 110 in client computing device 100 in accordance with a further embodiment. System 200 includes a server 240, object server 250, database 260, application 270, and asset object storage device 280.

One or more client computing devices 100 are coupled over communication links to one or more networks 230. Server 240, object server 250, and database 260 are also coupled over communication links to one or more networks 230. Network 230 can be any data network or combination of data networks, including but not limited to, a computer or telephony network, local area computer network, medium area network or the Internet.

Server 240 can be any type of data server including but not limited to a server that can execute or support application 270. A web server can also be coupled to server 240 or can be a part of server 240. Object server 250 can be any type of data server including but not limited to a server that can manage and access data stored in asset object storage device 280. A web server can also be coupled to object server 250 or can be a part of object server 250.

According to a feature, application 270 can communicate with browser 110 to provide data and instructions to configure browser 110 to include presentation controller 112 and editor 114 so that data can be presented in a controlled presentation on canvas 120 as described herein. Application 270 can be a web application or other application provided online or over the Web to communicate with browser 110.

Database 260 stores data that can be used by education canvas manager 112 for presentation on canvas 120. In one example, database 260 stores data that includes one or more of text content, accessibility content, text-based image definitions (e.g., scalable vector graphic (SVG)), references to external raster image assets, and references to external objects (e.g., audio files, assessment items). In one implementation, database 260 can be a relational database used with a database management system that provides JSON support. Asset object storage device 280 can be any computer-readable memory device that stores objects for use by education canvas manager 112 for presentation on canvas 120. This can include images, audio files, etc.

In operation, an author can point or navigate browser 110 to access application 270. Authentication or other permissions may be needed to access application 270. At initialization, presentation controller 112 and editor 114 are automatically provided to browser 110. For example, application 270 can send appropriate logic and data to browser 110 to configure the rules and operation of browser 110 to include the functionality of presentation controller 112 and editor 114. In this way, browser 110 can display content for orderly and beautiful presentation as described herein.

During operation, browser 110 having presentation controller 112 and editor 114 can work online or offline to allow a user to author content. Functionality of presentation controller 112 and editor 114 can also be shared between browser 110 and application 270 to distribute processing and work required between client device 100 and server 240 as would be apparent to a person skilled in the art given this description.

Figure 3:
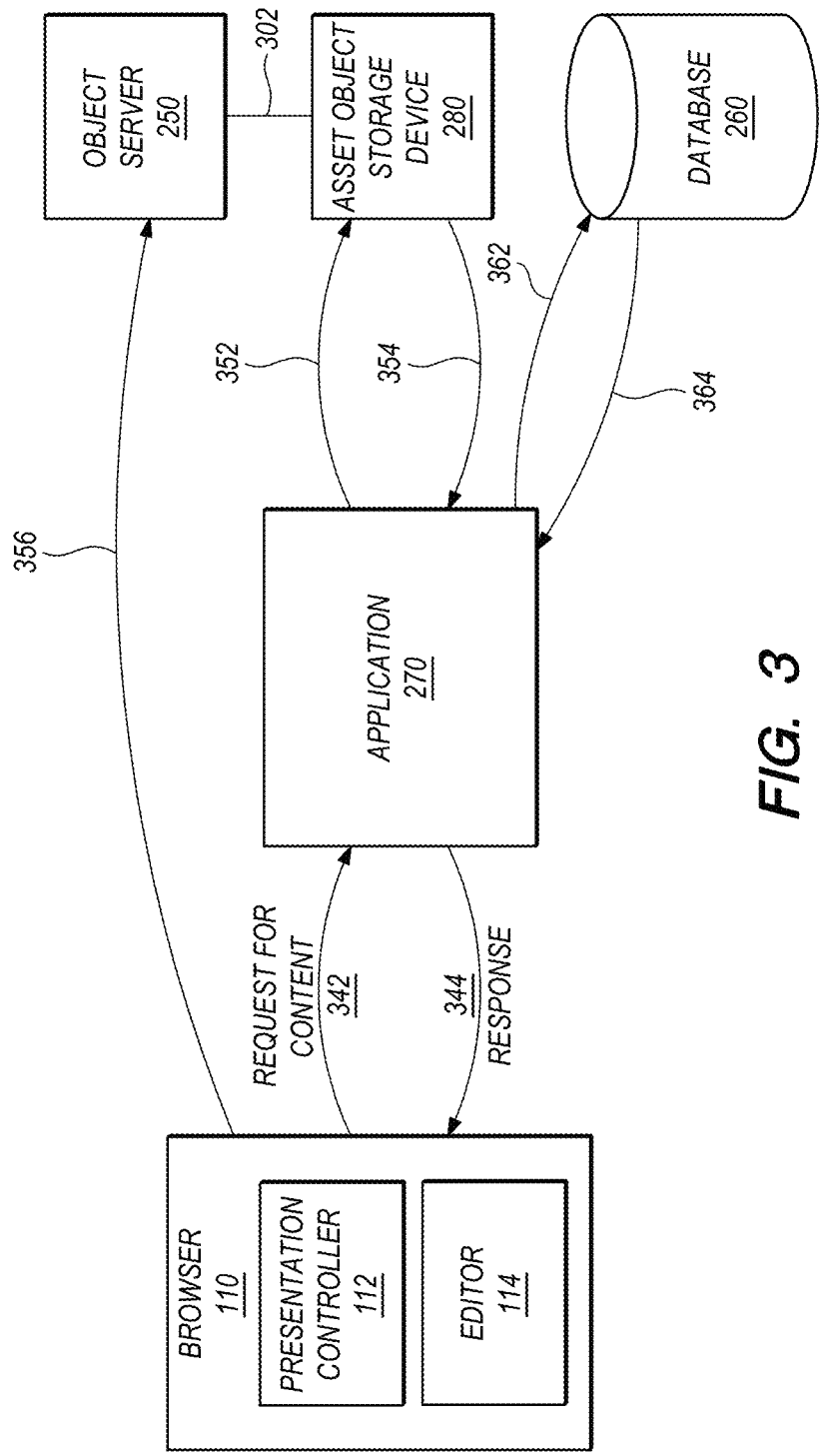
FIG. 3 shows an example data flow that can be used in the system of FIG. 2 in accordance with an embodiment.

FIG. 3 shows an example data flow that can be used in the system of FIG. 2 in accordance with an embodiment once access is granted and content authoring operation begins. This example is illustrative and not intended to be limiting.

Browser 110 (including presentation controller 112 and editor 114) can make a request for content 342 to application 270. Application 270 can in turn access one or more objects from asset object storage device 280. These objects can be associated with or identified in the content request 342. For example, application 270 can send a request 352 for the object(s) and receive a response 354 with returned object(s). Application 270 then returns a response 344 with the returned object(s) to browser 110 to fulfill the content request 342. Browser 110 can also make requests of object server 250 to obtain objects. Application 270 can also read and write data to database 260 as indicated by signals 362, 364.

It is helpful to describe the operation of presentation controller 112 and editor 114 further with respect to specific examples of content which may be authored as shown in FIGS. 4A and 4B, and FIGS. 5A-5F.

Figure 4A:
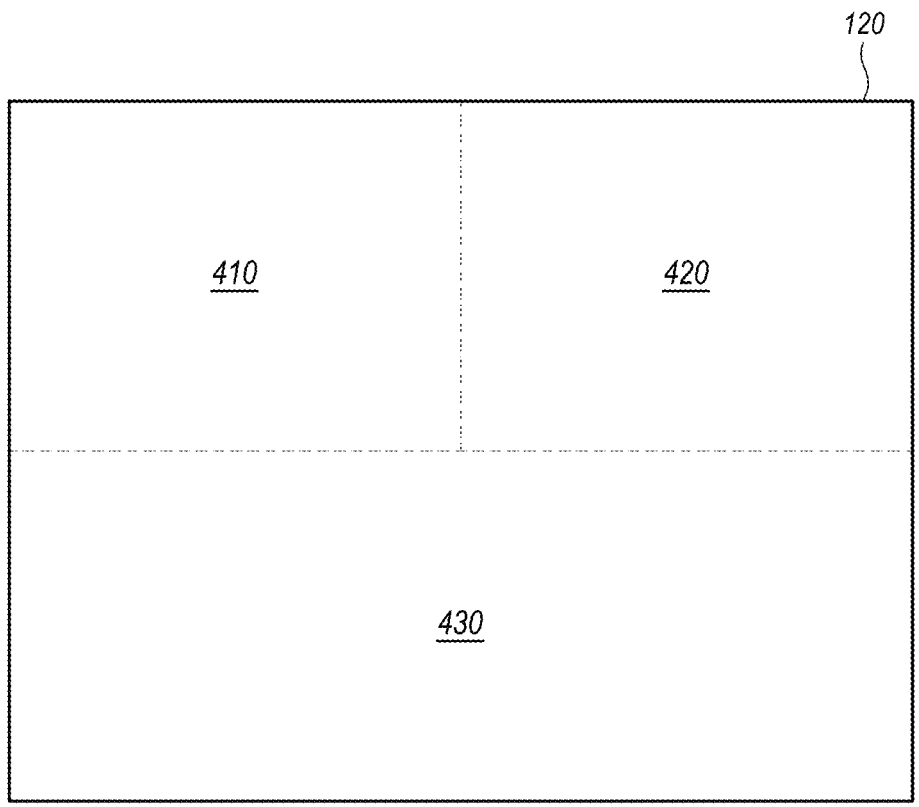
FIGS. 4A and 4B illustrate examples of a presentation controlled canvas operation in accordance with an embodiment.
Figure 4B:
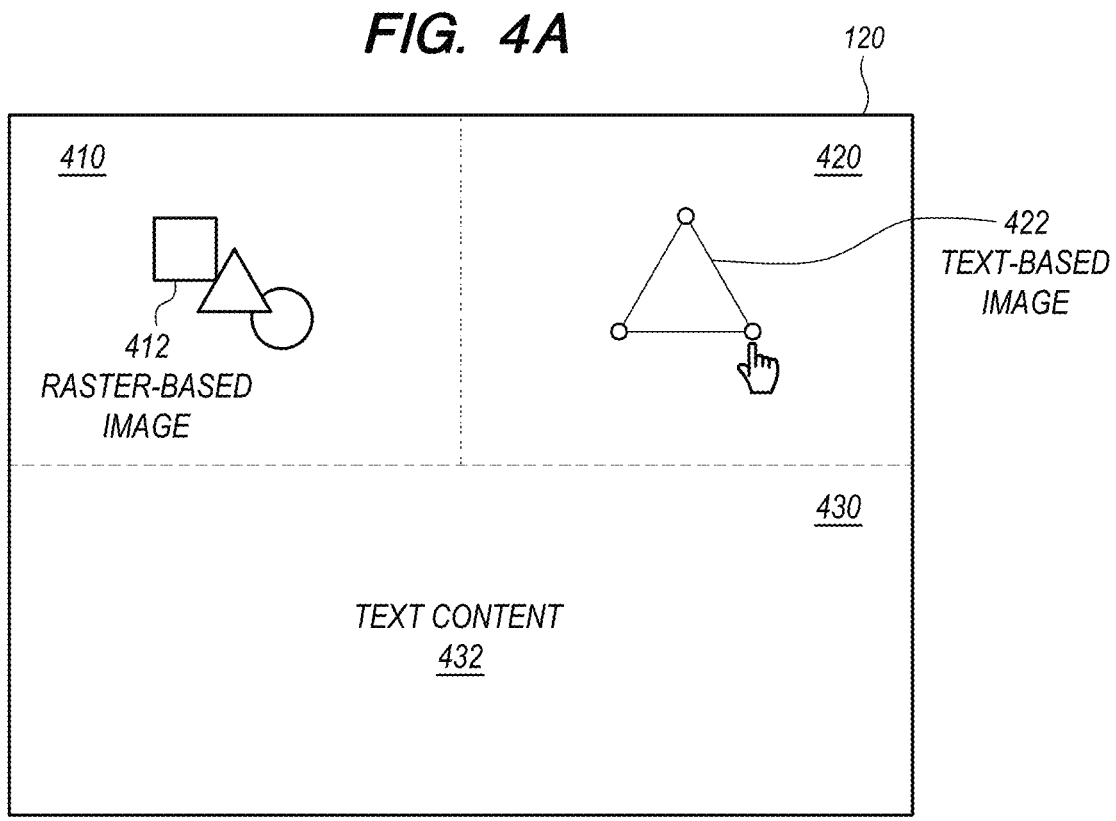

FIGS. 4A and 4B illustrate examples of a presentation controlled canvas operation in accordance with an embodiment. Consider the case where a user at client computing device 110 wishes to create a lesson with raster-based and text-based images, and text content. One advantage of this embodiment is that a user can simply view canvas 120 on display 115 using browser 110. To author the desired lesson, the user can select three different objects, raster-based image 412, text-based image 422, and text content 432. This selection of objects can be done in any way permitted by browser 110 including a graphical user input, voice input, or other input.

Presentation controller 112 then requests content associated with the selected objects 412, 422, and 432. These requests for content can be made to application 270, object server 250, or to a locally stored location or cache, or to another remote location if known. Presentation controller 112 then evaluates the objects based on content type and size and maximum available space on canvas 120. Presentation controller 112 also sets defaults and applies rules that take into account an instructional context and likely preferences for orderly and beautiful presentation of content in such an instructional context.

In one example, presentation controller 112 uses a grid (such as a 8×12 grid of equal sized regions) representing the maximum area of canvas 120. Presentation controller then determines a layout of the three objects and spacing between them. For example, as shown in FIG. 4A, presentation controller 112 may divide the grid for the canvas 120 into three regions 410, 420, 430 to create an orderly and beautiful presentation. In this case, regions 410 and 420 are equal in area size and half the area of region 430. As shown in FIG. 4B, under the control of presentation controller 412, text content 432 is centered in region 430 with an appropriate font size and style for that sized region. Raster-based image content 412 is centered in region 410 with an appropriate size, and text-based image content 422 is centered in region 420 with an appropriate size. In this way, an orderly and beautiful lesson is created simply by an author. The author need not know advanced layout or styles settings or controls of a particular application much less for different types of objects.

In some cases, an author may select different objects over time as he or she creates and edits a lesson. In a further feature, orderly and beautiful presentation on canvas 120 can occur even as objects are being selected or edited.

Figure 5A:
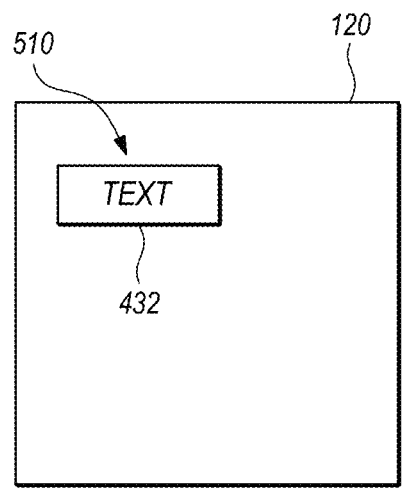
FIGS. 5A, 5B, 5C, 5D, 5E and 5F illustrate examples of a presentation controlled canvas operation in accordance with an embodiment.
Figure 5B:
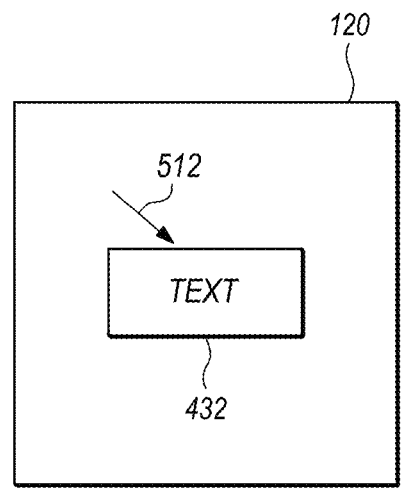
Figure 5C:
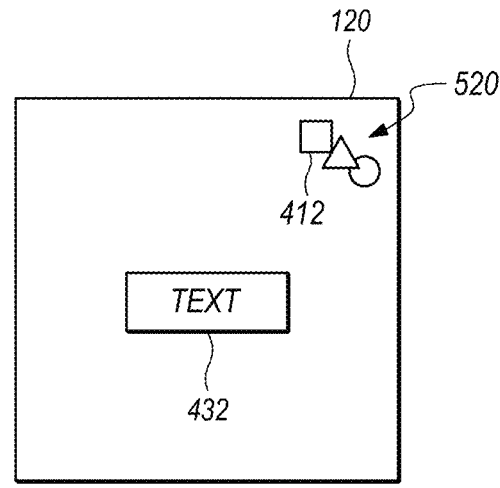
Figure 5D:
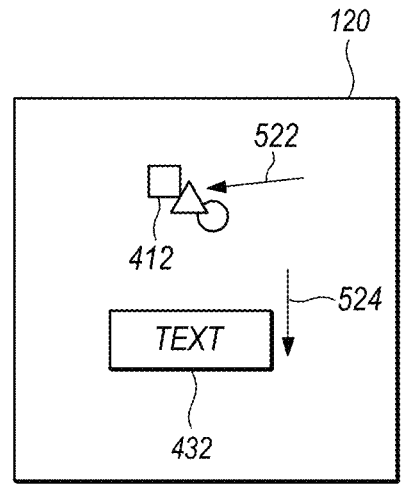
Figure 5E:
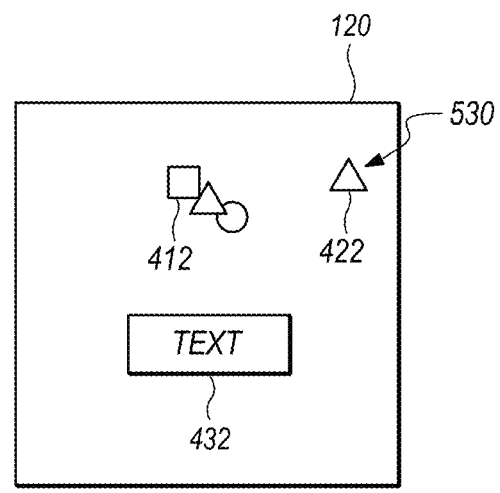
Figure 5F:
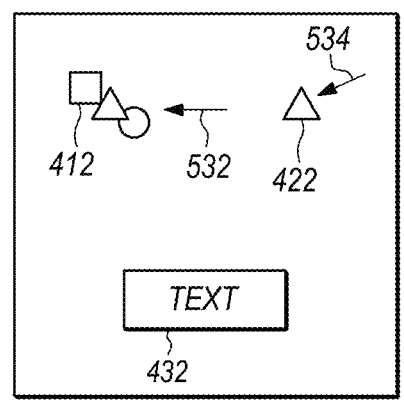

FIGS. 5A, 5B, 5C, 5D, 5E, and 5F illustrate examples of a presentation controlled canvas operation as three different objects are selected at different times by an author. Consider the case where a user at client computing device 110 wishes to create a lesson and selects raster-based and text-based images, and text content at different times as he or she authors the lesson plan. FIGS. 5A, 5C, and 5E show the selection of an object while FIGS. 5B, 5D, and 5F show the resulting display after presentation controller 112 operates to present an orderly and beautiful presentation on canvas 120.

Presentation controller 112 still requests content associated with the selected objects 412, 422, and 432 as described above with respect to FIG. 4 but adjusts the display as the content is authored. Requests for content can be made to application 270, object server 250, or to a locally stored location or cache, or to another remote location if known. Presentation controller 112 evaluates the objects 412, 422, 432 as the user selects them based on content type and size and maximum available space on canvas 120. Presentation controller 112 also sets defaults and applies rules that take into account an instructional context and likely preferences for orderly and beautiful presentation of content in such an instructional context as the objects are added or edited.

Initially, the user may select text content 432 as shown in FIG. 5A. For example, a user may drag and drop text content from another file or application onto canvas 120 as shown by arrow 510. Presentation controller 112 then requests content associated with the selected object 432 from a clipboard or cache in the case of a drag and drop from a known locally stored file or application. More generally the request for text content 432 can be made to application 270, object server 250, or to a locally stored location or cache, or to another remote location if known.

Presentation controller 112 then evaluates the text object 432 and determines it is text of a certain size and assesses the maximum available space on canvas 120. Presentation controller 112 can also set defaults and apply rules that take into account an instructional context and likely preferences for orderly and beautiful presentation of content in such an instructional context. In one example, presentation controller 112 uses a grid (such as a 8×12 grid of equal sized regions) representing the maximum area of canvas 120. Presentation controller then determines a layout for object 432 and may place the object centered on canvas 120 with a larger font size as shown in FIG. 5B.

Next a user may select raster-based image content 412 as shown in FIG. 5C. For example, a user may select a raster-based image 412 from another file or application and indicate its placement onto canvas 120 as shown by arrow 520. Presentation controller 112 then requests content associated with the selected object 412 from application 270, object server 250, or a locally stored location or cache, or to another remote location if known.

Presentation controller 112 then evaluates the raster-based image object 412 and determines it is a raster-based image of a certain size and file format type and assesses the maximum available space on canvas 120. Presentation controller 112 can also set defaults and apply rules that take into account an instructional context and likely preferences for orderly and beautiful presentation of content in such an instructional context. Presentation controller 112 may use the grid (such as a 8×12 grid of equal sized regions) representing the maximum area of canvas 120 and take into account the sizes of raster-based image object 412 and text object 432 and a minimum frame size for raster-based image object 412. Presentation controller then determines a layout for objects 412 and 432 and may place the objects 412 and 432 centered on canvas 120 above one another in equal sized regions as shown in FIG. 5D and indicated by movement arrows 522, 524.

Next a user may select text-based image content 422 (e.g. SVG) as shown in FIG. 5E. For example, a user may select a text-based image 422 from another file or application and indicate its placement onto canvas 120 as shown by arrow 530. Presentation controller 112 then requests content associated with the selected object 422 from application 270, object server 250, or a locally stored location or cache, or to another remote location if known.

Presentation controller 112 then evaluates the text-based image object 422 and determines it is a text-based image of a certain size and file format type and assesses the maximum available space on canvas 120. Presentation controller 112 can also set defaults and apply rules that take into account an instructional context and likely preferences for orderly and beautiful presentation of content in such an instructional context. Presentation controller 112 may use the grid (such as an 8×12 grid of equal sized regions) representing the maximum area of canvas 120 and take into account the sizes of all three objects 412, 422, and 432 and their minimum sizes. Presentation controller then determines a layout for objects 412, 422, and 432 and may place the objects 412, 422 and text content 432 centered in a bottom region with an appropriate font size and style for that sized region and raster-based image content 412 and text-based image content 422 placed side by side and centered respectively in regions with appropriate sizes above text object 432 as shown in FIG. 5F and movement arrows 532 and 534.

In this way, an orderly and beautiful lesson is created simply by an author as objects are selected. The author need not know advanced layout or styles settings or controls of a particular application much less for different types of objects.

View Mode and Edit Mode

In a further feature, a view mode and edit mode of operation are provided in for author content creation. For example, application 270 in communication with browser 110 provides a view mode and an edit mode. In the view mode, presentation controller 112 controls presentation of objects to a consumer of instructional content. In the edit mode, the editor 114 allows the author to edit presentation of objects by presentation controller 112. In this way, an author by simply using a browser and easily view and edit instructional content.

This is even more significant considering existing applications are often feature-rich or complex, burdensome to authors, and do not easily handle different object types. These problems are especially acute with multimedia or video objects which are often desired in instruction. Conventional video players only play video. Even if video players allow editing as in some movie applications none of them allow manipulation of images or editing of text separate from the video as is needed in instruction. A teacher viewing a video can't manipulate individual objects to further an instructional goal. Often a teacher must add a voice over or simply talk while a video is paused or played.

One advantage of embodiments herein is an author can manipulate objects when creating content including a text-based image such as image 422 discussed with FIGS. 4 and 5. Text-based images can be rendered directly by a browser. In this way, a user can interact with the image directly to move or manipulate the image. Interactions can be direct or indirect and can be tracked by a system and set to application 270 for storage and analysis.

In one feature, an edit mode can also include one or more of the following operations: operations to add or remove text, edit or align format, add or remove images, edit, align or select from a client computing device, crop an image, add or remove tables, move around objects in a layout, display space an object occupies on a grid (e.g, with dotted lines), resize space an object occupies on a grid, add voiceover, and spell check for text.

In another feature, a view mode can include one or more of the following operations: operations to display content without borders to users viewing the content, add this resource among other instructional content (questions, documents, etc.), and include teaching notes as guidance for instructional practices.

Reflow for Output Printing or File Creation

Figure 6:
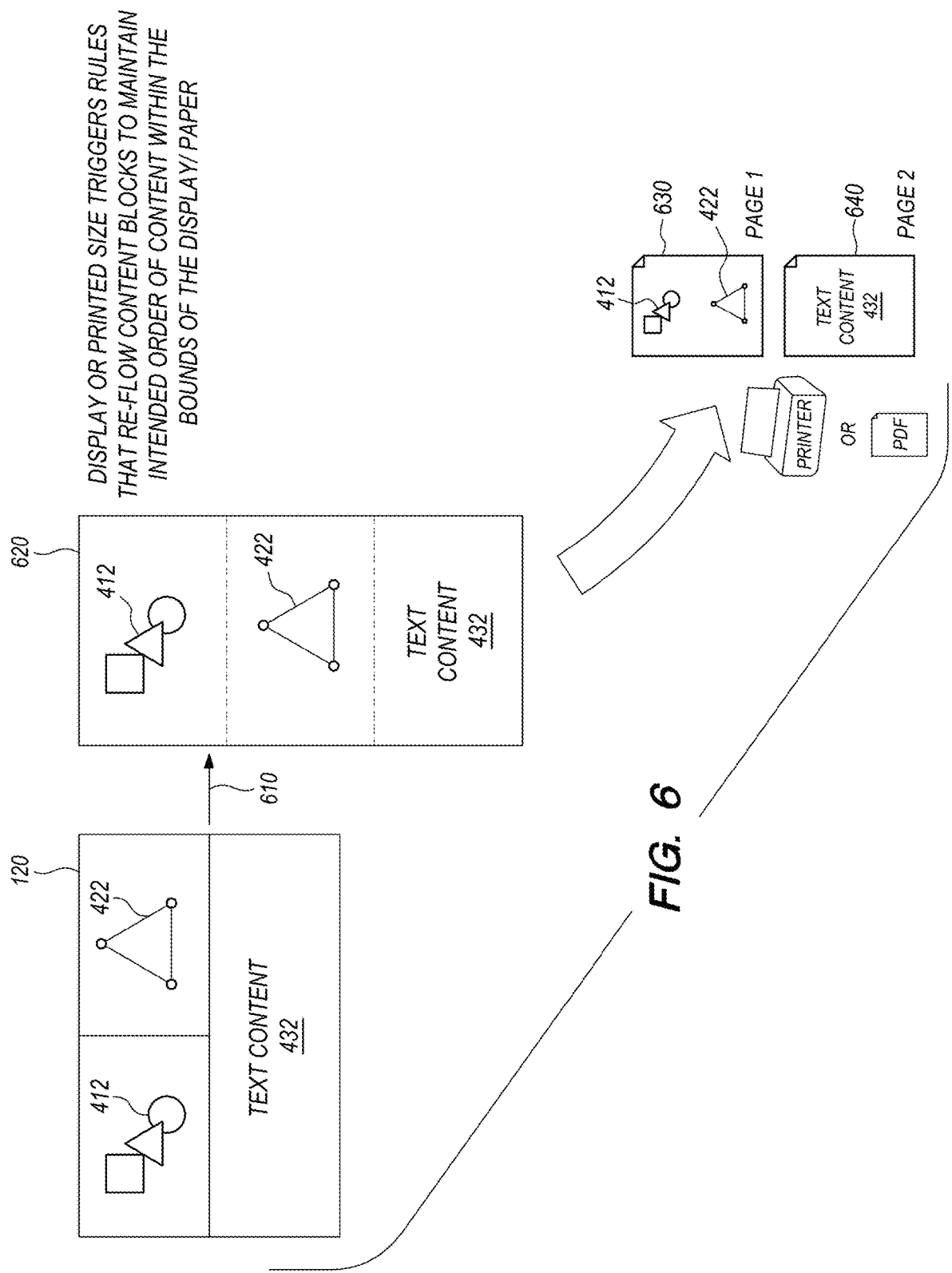
FIG. 6 illustrate examples of a display output reflow operation in accordance with an embodiment.

FIG. 6 illustrates examples of a display output reflow operation in accordance with an embodiment. In a further embodiment, a user can select to display or print the content shown on canvas 120. Presentation controller 120 can reflow the content of blocks or regions to maintain an intended order of content within the bounds a particular printer or output file format. For example, canvas 120 discussed with example in FIG. 4B may be output for printing or exported to a file such as an Adobe PDF file. Presentation controller 120 reflows the content to an order 620 which can then be printed or exported as two pages 630, 640.

Further Examples of Orderly and Beautiful Presentation

These above examples of controlled presentation of instructional content are illustrative and not intended to be limiting. Indeed the controlled presentation of content on canvas 120 carried out by presentation controller 112 can take into account a number of parameters, rules, and design goals as would be apparent to a person skilled in the art given this description. For example, logic and rules can be provided so presentation controller 112 reduces time it takes for a user to create a layout.

Presentation controller 112 can make smart decisions using a number of different criteria to provide an orderly and beautiful presentation. These criteria can include, but is not limited to: how much space and where the object occupies based on the intent of the user (where they drag/place the object), the size of images based on the amount of space the object occupies and the size of the original image, and how to minimize placement options or objects (in a grid) in order to save time. Presentation controller 112 can also take advantage of one or more objects being included in content blocks.

Presentation controller 112 can provide for resizing of objects. For example, resizing can be available as an option whenever there are two or more content blocks. Selecting a border and dragging will start this interaction regardless of whether the content block is currently selected.

In other features, all lines and/or content blocks can snap to an underlying grid. Each content block can have set padding to ensure proper spacing between elements for readability. A minimum width and height can be required for any content block (this ensures content does not become so small as to be illegible).

In an example, resizing of a border is carried out so it only affects two adjacent content blocks. If the adjacent content block has reached the minimum size available, the user cannot resize further. If the content blocks adjacent to the border are not fully aligned and a resize between just two of the blocks would leave odd shapes or blank space, the resize should affect multiple adjacent blocks. Images are resized appropriately within the content block (max out at 100% width or height).

In a further feature, slides exist in two modes: edit mode, where controls are available to add, remove, and modify items on the side, and display mode, where all controls are removed and the content is displayed as laid out.

In one example, content blocks fill the entire available canvas at all times. If there is one content block, it takes up 100% height and width of the canvas. Content blocks (comprised of different types of objects) can be dragged onto the canvas.

In a further example, each content block includes two levels of controls: one affecting the presentation of the block and another for the presentation of content within the block. Block-level controls include vertical and horizontal alignment and background colors. Content-level controls include text formatting, shape of dialogue, color of dialogue, and placement of image caption.

On initial placement of a content block, the block is filled with placeholder content until the user edits it. Slides can be inserted into other containers (i.e., lesson plans) and reused across different containers. Text cannot be sized below a minimum to ensure readability. Text is resized automatically for the device or context (fullscreen, print) in which it is viewed. Text can also be resized by an author if desired.

Slides can have a particular aspect ratio when viewed on larger devices to ensure layout is maintained as the author intended. For smaller client computing devices and displays, content is stacked in a linear layout based on inferred or set reading order.

Note browser settings including browser defaults can also be used where desired. For example, slides can be set to a default reading order based on the row of the grid where a content block starts (grid-row-start is used to set the default reading order). Authors, though, may override the browser defaults. In one example, authors can set the intended reading order for the content to ensure assistive technology and mobile devices present the information properly. Once a user changes the reading order, content blocks which are added, moved, or removed will trigger a notification flag. The notification flag is shown to let the user know that they may need to update their reading order due to the subsequent layout changes they have made.

When content blocks are dragged around the canvas, available drop areas are indicated to the user. If space is available (based on minimum widths and heights for the content block), the user may drop a block within an existing block (halving the space occupied by the other block) or create a new row or column in the canvas. Once placed on the canvas, content blocks can be moved by users by drag and drop. Upon selecting a block to move, the content block is extracted from the canvas with surrounding content blocks reclaiming the space. Indicators are used to display the available drop areas as the user moves the content block around the canvas.

When a content block is removed from the canvas, other blocks expand into the space left behind, starting with blocks in the row but if the row cannot fully fill the canvas, blocks in the column expand to fill it. When dragging a piece of content or new block, areas to drop it are created around every existing content block in the canvas. These drop areas are determined by dividing each block into, for example, four invisible triangles splitting up the block. These triangles extend slightly past the block edges. They allow users to drop content to the left, right, top, or bottom of existing content. These triangles are themselves split into two areas allowing for a drop that splits the existing content or, if possible, a drop that spans as many contents as possible in that direction.

Rules for spanning contents look at what content is inline with the current content block (e.g. within the same grid space relevant to where a user is dropping (left, right, bottom, top)) and content that is splittable (above minimum size). A slide resource can be backed by an array of content blocks that contain information on their location in the slide, their size, and their contents. Content information may include, for example, text, alignment/viewing options, resource links, or raw HTML. The slide grid will reflow contents when the viewing port becomes too small as a one column stack of contents in either a default order of reading the larger grid left to right or in an order specified by the user.

For example, a content block can be as simple as a text box or a more complicated multi-part object such as a character with a speech bubble with a corresponding text caption. Further examples of content blocks are image, text, character, speech bubble, and table. And these items can be combined with each other in certain iterations such as image with text caption, or character with speech bubble.

Figure 7A:
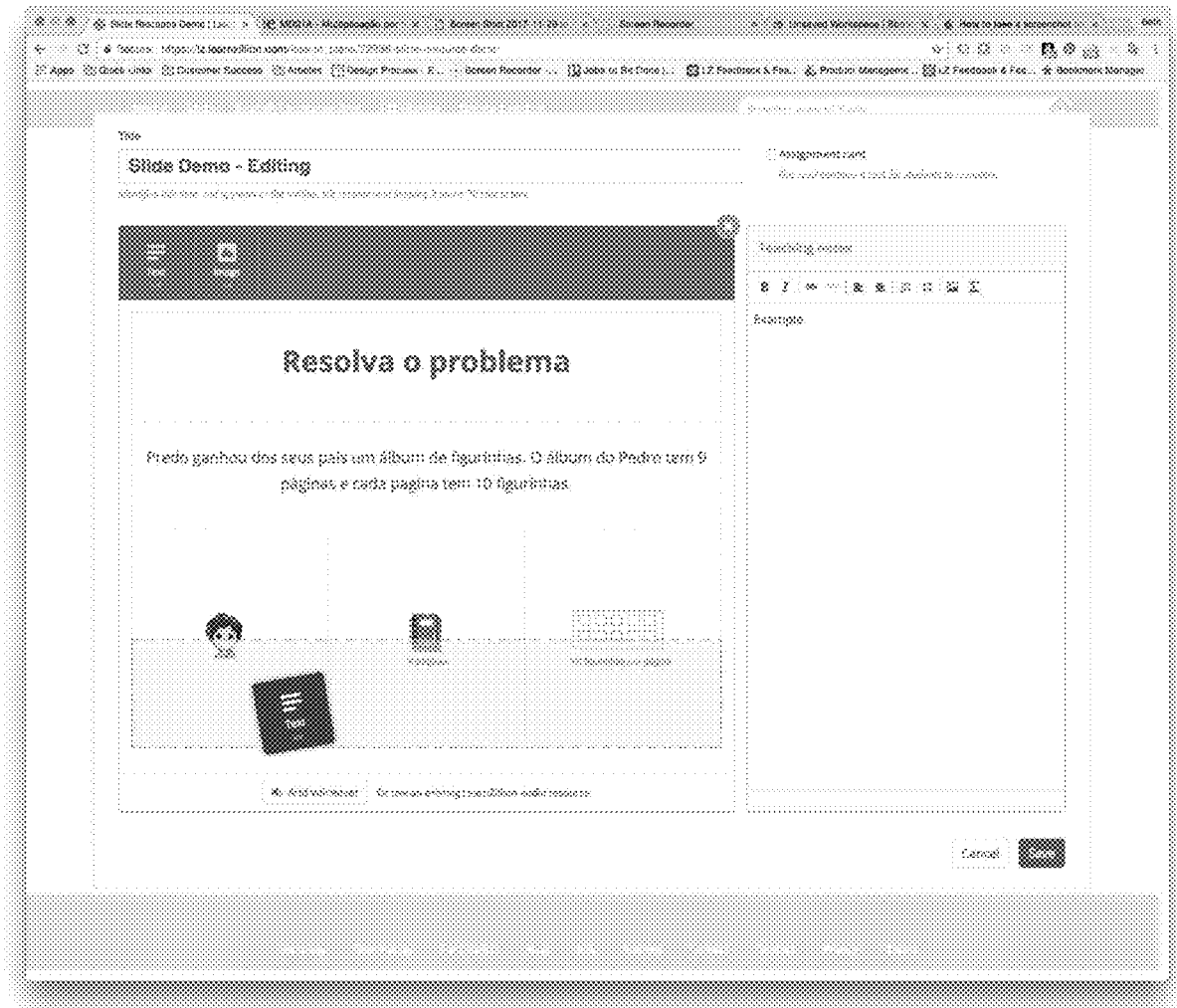
FIGS. 7A and 7B are screenshot diagrams of example browser displays having a presentation controlled canvas according to an embodiment.
Figure 7B:
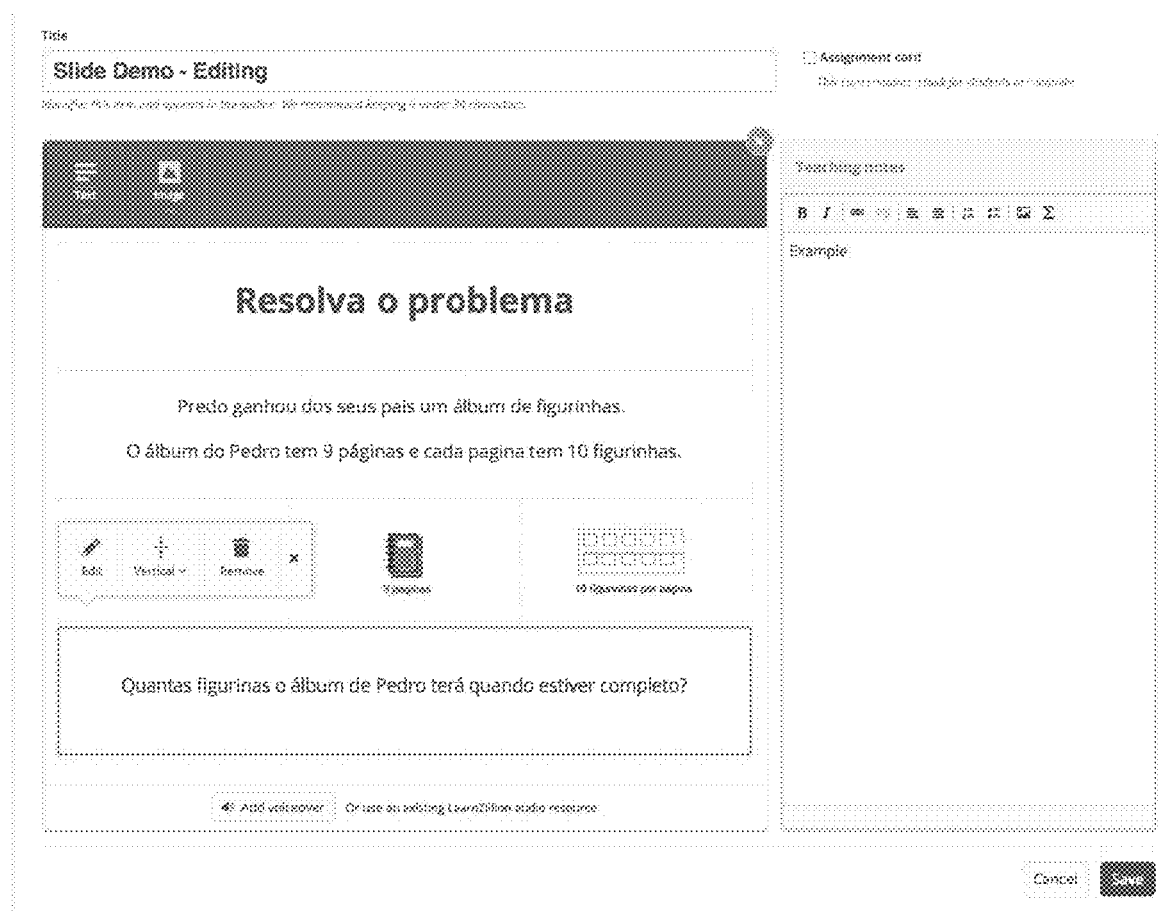

FIGS. 7A and 7B are screenshot diagrams of example browser displays having a presentation controlled canvas for assignment cards according to an embodiment. Each diagram also includes an assignment card for objects that may include text and image objects, a title designation bar, assignment card check box, and an area for teacher notes. Buttons for adding a voice over or selecting an audio file are provided. Save and cancel control buttons are shown as well. FIG. 7A shows one example of an assignment card with content that can be authored, including user indicating a selection of Portuguese language text that is to be added. FIG. 7B shows the assignment card of FIG. 7A with the selected Portuguese language displayed.

FIGS. 8A to 8L are screenshot diagrams of further example browser displays having a presentation controlled canvas for assignment cards according to an embodiment. Each diagram also includes an assignment card for objects that may include text and image objects, a title designation bar, assignment card check box, and an area for teacher notes. Buttons for adding a voice over or selecting an audio file are provided. Save and cancel control buttons are shown as well.

In each of FIGS. 8A to 8L, a user can select desired text or image to add to assignment cards in the presentation controlled canvas portion of the display. To add text that appears in the assignment cards of FIGS. 8A to 8L, a user can, for example, drag and drop or select a text box in the canvas and then enter the text. To add the images that appears in the assignment cards of FIGS. 8A to 8L, a user can select one or more image files to place on the canvas, cut and paste an image, or drag and drop an image. These user interface inputs are illustrative and other type of inputs can be used.

Figure 8B:
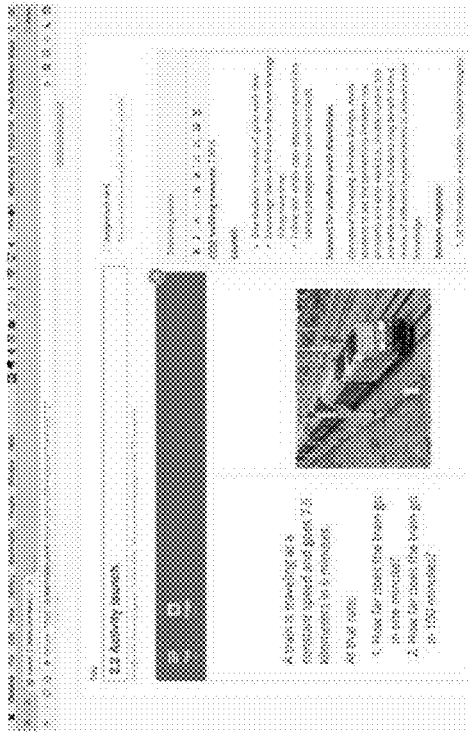
FIGS. 8A, 8B, 8C, 8D, 8E, 8F, 8G, 8H, 8I, 8J, 8K and 8L are screenshot diagrams of further example browser displays having a presentation controlled canvas according to an embodiment.
Figure 8D:
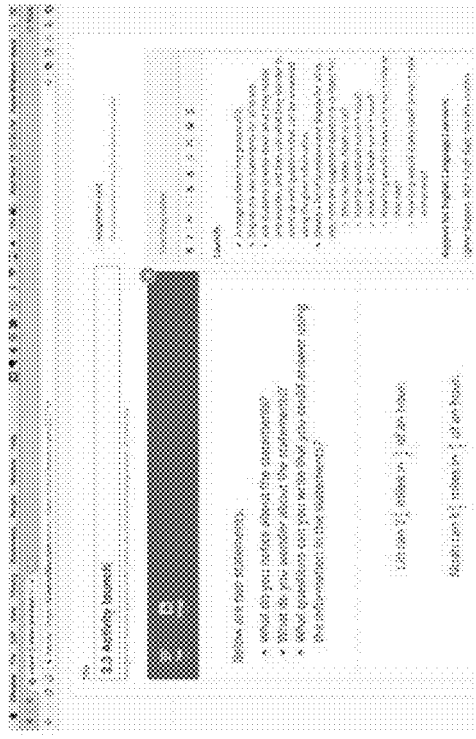
Figure 8A:
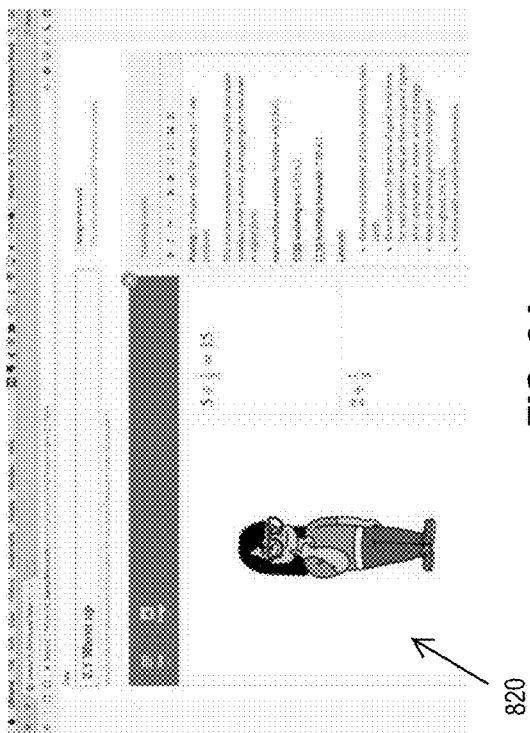

The selected text and images can be examples desired by the author to make up instructional content as shown in FIGS. 8A to 8L. For example, text can be instructional content, such as instructions, statements, questions, answers, dialogue, or problems. Images can be images that make up instruction content. To create one assignment card, an author may select an image of a figure of a person and text for two math problems to be included on the canvas. Presentation controller 112 then automatically arranges the selected objects as shown in FIG. 8A to present an orderly and beautiful presentation. This arrangement is carried out in a controlled fashion as described herein taking into account one or more of maximum available canvas size, content type, content size of the object, the number of objects, spacing between objects, and other criteria. Font styles including size can also be adjusted. The user need only focus on the selection of content through easy use of a browser. A user does not need to have detailed knowledge of authoring tool functionality like setting margins, font size, setting block sizes or spacing, or laying out objects. This is especially helpful for teachers or other instruction content creators to allow them to easily create instruction content arranged in an orderly and beautiful fashion.

Figure 8C:
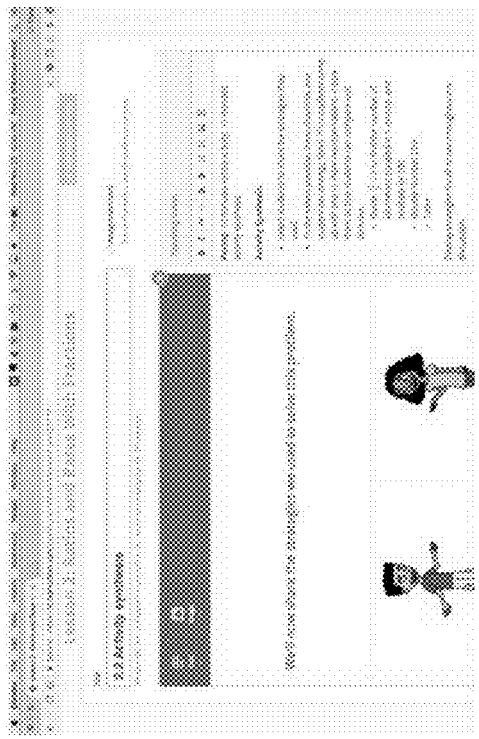
Figure 8E:
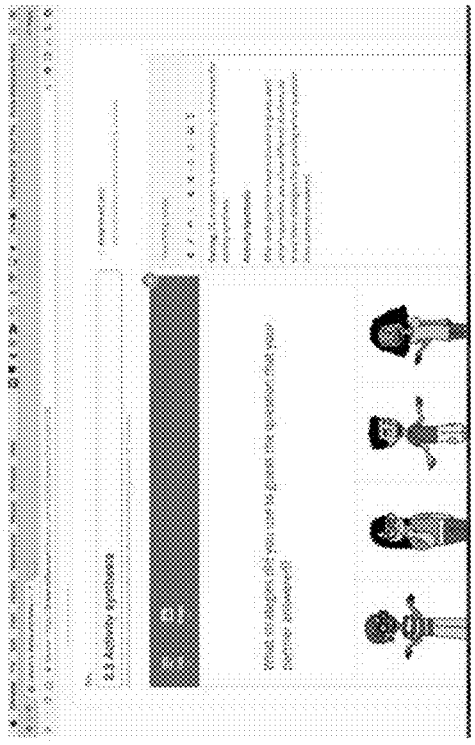
Figure 8F:
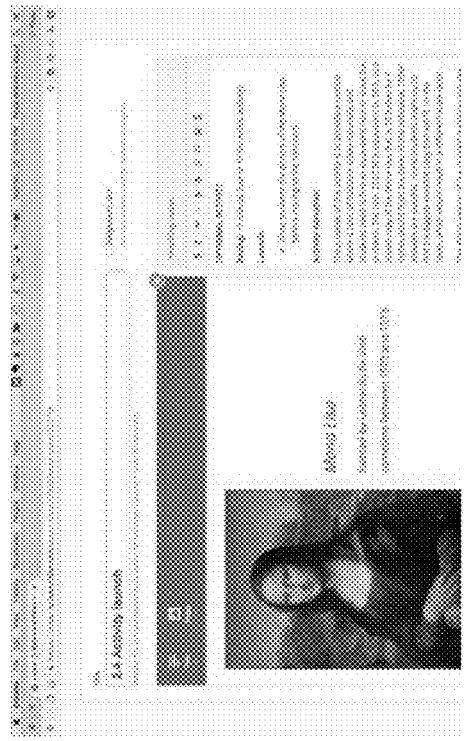

FIGS. 8B to 8L show further examples of different objects with text content and/or image content selected by an author which are similarly automatically arranged by a presentation controller 112 to present an orderly and beautiful presentation. FIG. 8B shows a text for a math problem relating to train movement arranged side by side with a photo of a train. FIG. 8C shows two images of human figures arranged side by side with text caption above them about discussing strategies to solve a math problem. FIG. 8D shows two text boxes centered and arranged one above the other with sizing to fill the canvas and provided appropriate spacing and text size for clear viewing. FIG. 8E shows a text box with three questions centered and arranged to fill a maximum available canvas space. FIG. 8F shows four images of human figures arranged side by side with text caption above them about strategies used to solve a math problem, one above the other.

Figure 8G:
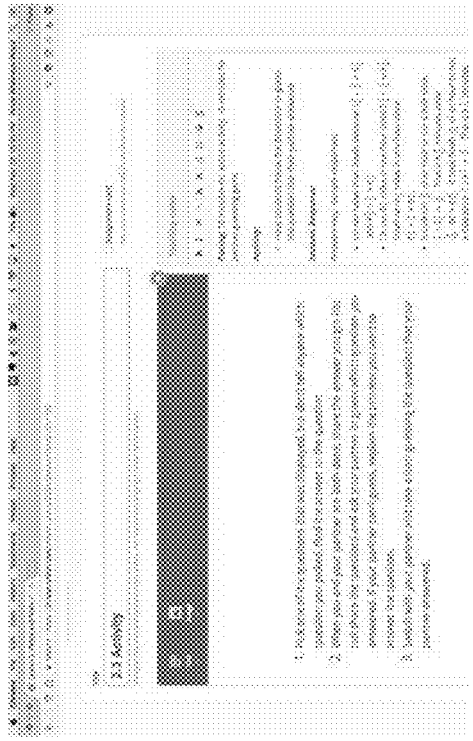
Figure 8H:
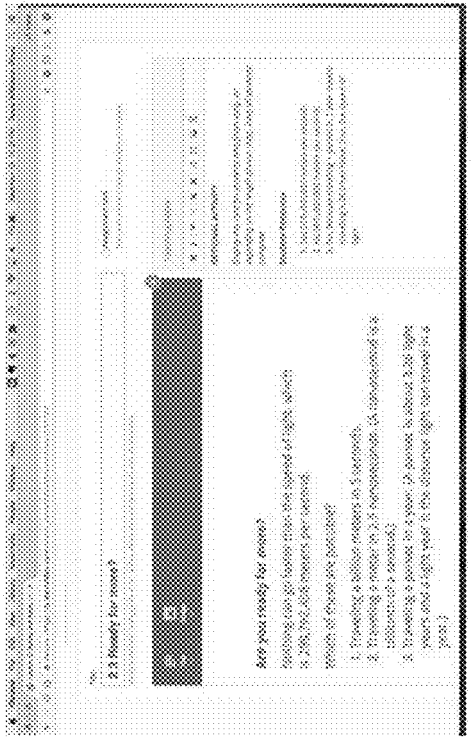
Figure 8I:
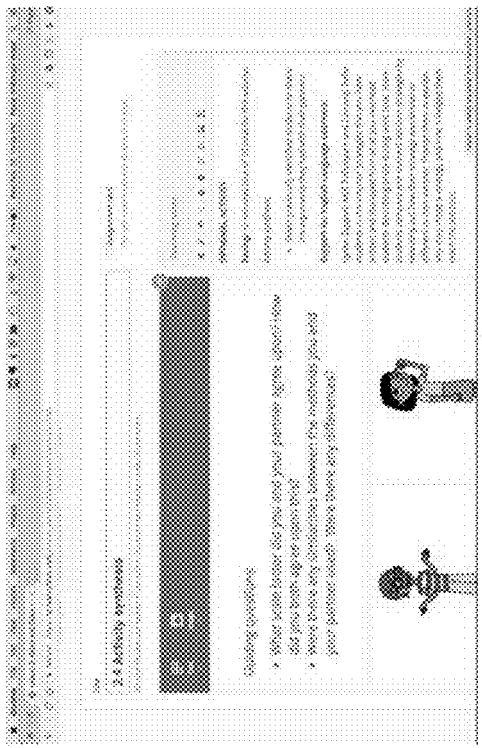
Figure 8J:
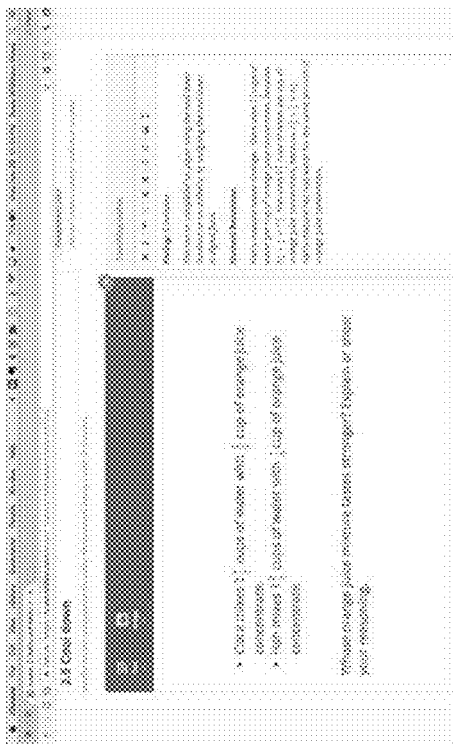
Figure 8K:
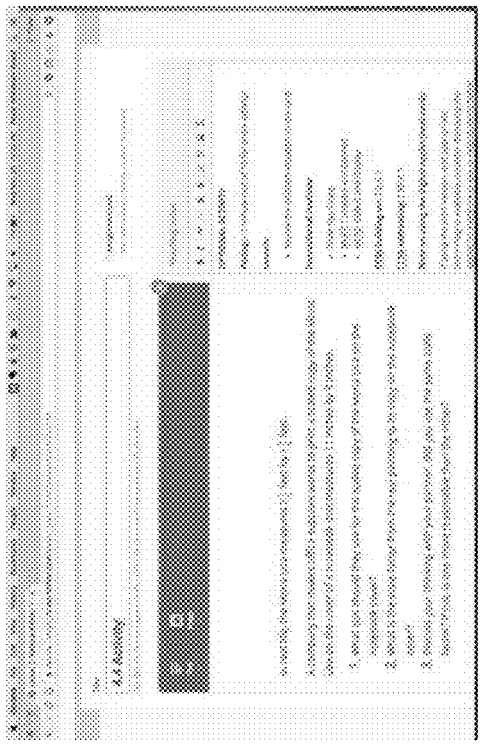
Figure 8L:
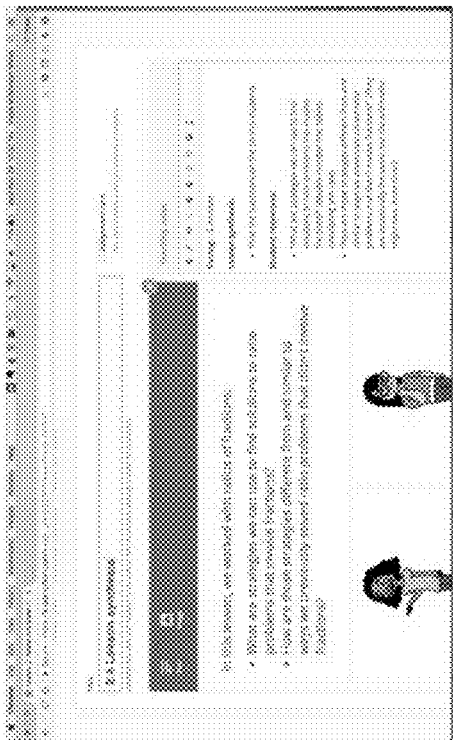

FIG. 8G shows a text box with questions centered and arranged to fill a maximum available canvas space. FIG. 8H a photo of a Mona Lisa painting arranged side by side with explanatory text. FIG. 8I shows a text for a math problem relating to sizing a scaled copy of a Mona Lisa painting where the text is centered and arranged to fill the canvas. FIG. 8J shows two images of human figures arranged side by side with text arranged in a box above them about strategies used to solve the scaling math problem. Likewise, FIG. 8K shows two images of human figures arranged side by side with text arranged in a box above them about further explorations and queries that can be made on fraction or ratio problems. Finally, FIG. 8L shows two text boxes arranged above each other with text on a further math problem. These series of assignment cards illustrate an advantage of an embodiment herein as teachers or other content creators can easily create instruction content arranged in an orderly and beautiful fashion through a browser. The content creators need only focus on the selection of content through easy use of a browser and do not need to have detailed knowledge of authoring tool functionality like setting margins, font size, setting block sizes or spacing, or laying out objects.

Animation and Event Tracking

In further features, a presentation controlled canvas 120 can also include animation and/or event tracking. For example, animation of objects that appear in canvas 120 can be controlled according to a timeline and be made to appear and disappear to create animation. In one example, the animation of objects can be controlled according to an audio voiceover timeline. In this way, education content can be authored (created or edited) easily by interacting with canvas 120. This is especially advantageous to instructors or other authors of educational content as an author can manipulate the objects (add, remove, or edit) easily in a browser even though they will appear in an animation with an audio voiceover. This is much easier than current tools available which often require users to merely play a video clip without allowing any manipulation of objects within frames. Even if conventional movie editing tools are provided, these are often complex tools with steep learning curves and also do not allow objects to be manipulated easily through a browser as provided by the inventors here.

A further feature allows events relating to objects and their manipulation on canvas 120 to be tracked and reported for further data analytics processing and management.

Figure 9:
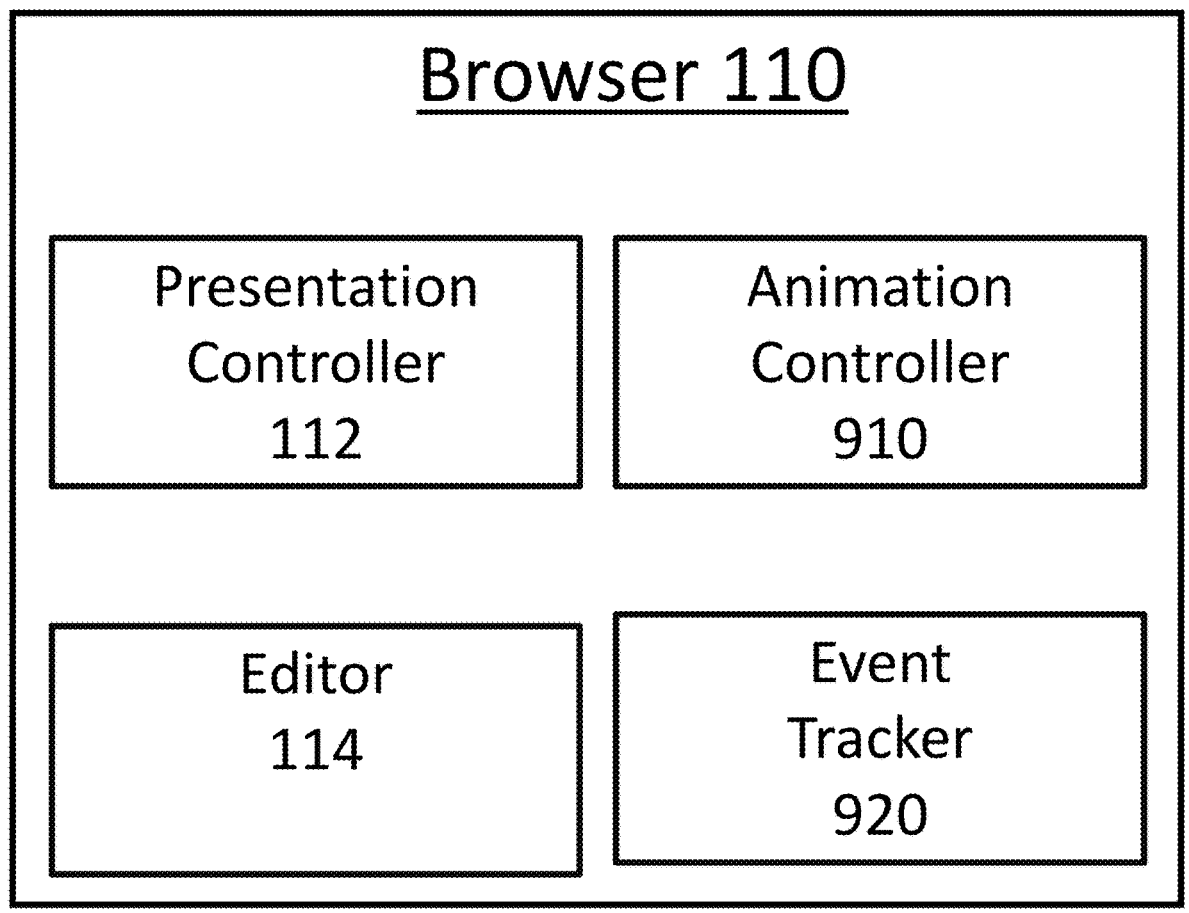
FIG. 9 is a diagram of a browser having a presentation controlled canvas with animation and event tracking in accordance with another embodiment.

FIG. 9 is a diagram of a browser 110 having a presentation controller 112 and editor 114 as described above and further including animation controller 910 and event tracker 920 in accordance with an embodiment. Animation controller 910 and event tracker 920 are shown separately for clarity, however, the embodiments are not so limited. Animation controller 910 and event tracker 920 can be provided as part of presentation controller 112 and/or editor 114. Animation controller 910 and event tracker 920 can also be provided on the same or on different computing devices than client computing device 100. In embodiments, browser 110 can be a commercially available web browser, such as, a CHROME browser available from Google Inc., an EDGE browser (or Internet Explorer) browser available from Microsoft Inc., a SAFARI browser available from Apple Inc., or other type of browser, which is further configured to include presentation controller 112 and editor 114 along with animation controller 910 and event tracker 920 in accordance with these embodiments described herein.

Animation controller 910 coordinates with presentation controller 120 to control animation of objects that appear in canvas 120. For example, when a user is creating content for animation on canvas 120, for example by selecting objects to appear on a series of assignment cards, animation controller 910 can create and store a timeline and store events associated with the objects and their presentation on canvas 120. Animation controller 910 can also store an audio voiceover synchronized with respect to the timeline.

In operation, a user can enter control inputs to browser 110 through a user interface (such as a keyboard, microphone, or touchscreen). For example, presentation controller 112 can allow a user to create a series of assignment cards. Within an assignment card, a user can select one or more objects as described above. A user can also through movements and selections on the canvas 120 indicate whether the objects are to appear or disappear or move to a different location. Animation controller 910 can record these object movements and selections as events on a timeline. In a view mode then, as the assignment cards are viewed on canvas 120, animation controller 910 follows the stored timeline and acts on objects according to the events to carry out the animation. In an edit mode, further changes to objects can be made in the animation and stored as events by animation controller 910.

For example, consider a series of assignment cards for a mathematics problem involving a summation of 3 carrots and 2 carrots to equal 5 carrots for a bunny rabbit. A user can select objects for 3 carrots (text and images) to appear on a first assignment card, 2 more carrots (text and images) to be added on a second assignment card, and a picture (SVG) of a bunny rabbit to appear on a third assignment card alongside the 5 carrots. Animation controller 910 can record these object movements and selections of objects for three assignment cards on the carrots as events on a timeline. An author can even select or record a voice over and store it as one or more audio files to accompany the presentation. For example, a 20 second voice over can be triggered to play as the animation of the assignment cards for the summation example of 5 carrots in an appropriate timing and according to triggered events from the assignment cards and their objects.

In a view mode then, as the assignment cards are viewed on canvas 120 animation controller 910 follows the stored timeline and acts on objects according to the events to carry out the animation. In the summation example, the sequence of 5 carrots (images and text) and bunny rabbit will appear over the time period of the timeline with voice over audio triggered by the events. In an edit mode, further changes to objects can be made in the animation and stored as events by animation controller 910.

Data corresponding to the animation generated under the control of animation controller 910 can be stored locally or remotely on the same or different computing devices, for example, locally at a client computing device 100 or remotely at a computing device running application 270. In one example, the data identifies which objects animate and when and is stored remotely for access by application 270.

Event tracker 920 tracks interaction of objects in presentation controlled canvas 120 such as those presented in a slide on canvas 120. This interaction can include any interaction by a user through a user-interface of browser 110, such as selecting one or more objects, adding or removing objects, editing objects, selecting a playback or stop button, or other control button, resizing, or other actions.

Event tracker 920 identifies and records the interactions as events associated with one or more objects, assignment cards, or other content items. This event data made up of events and associated content items can be stored locally or remotely. In one example, event tracker 920 sends captured event data over a network to a data collection service. The data collection service can provide further data analytics, processing, usage analytics, or machine learning for use in different applications.

In this way, the power of instrumenting each object in a slide with event tracking to report to a data collection service to provide fine-tuned usage analytics for machine learning, data science, or learning analytics purposes rather than broader, opaque usage analytics from static content types. Presentation controller 112 can communicate with event tracker 920 so that canvas 120 itself or objects on canvas 120 would trigger interaction data sending to application 270 for storage and analysis. This is especially advantageous for instructional content and instruction. The analysis could be data science, big data, or machine learning techniques that result in more precise diagnosis of student understanding or misunderstanding of content, tracking student trajectory, etc., as student views and interacts with a canvas 120.

Operation

Figure 10:
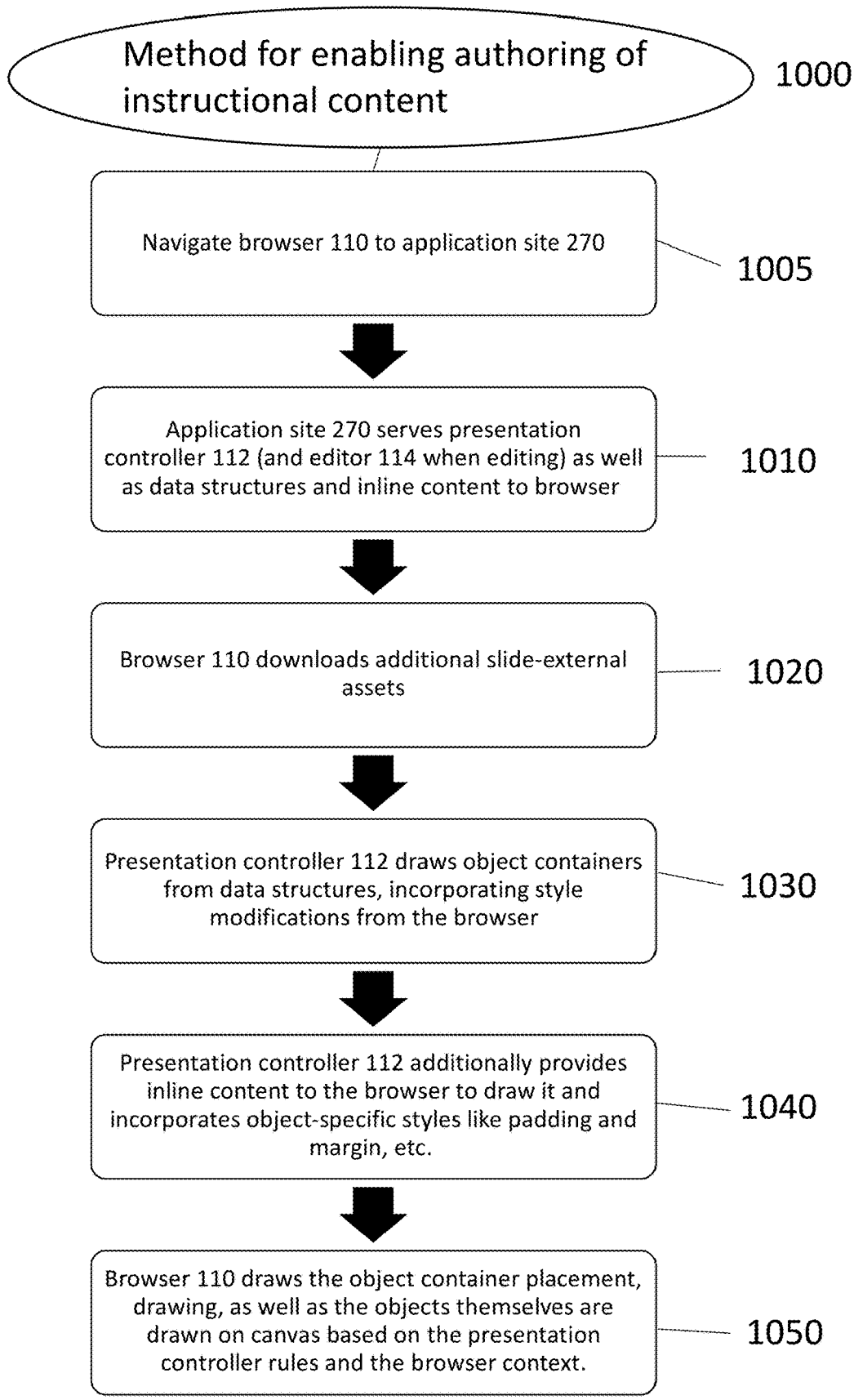
FIG. 10 is a flowchart diagram of a method for enabling authoring of instructional content in accordance with an embodiment.

Next the operation of system 200 will be further described with respect to method 1000 of FIG. 10 (steps 1005-1050) and the example in FIG. 8A. These examples are illustrative and not intended to limit method 1000.

FIG. 10 shows a flowchart diagram of a method for enabling authoring of instructional content 1000 in accordance with an embodiment. First, a user would navigate browser 110 to application site 270 (step 1005). Application site 270 then serves presentation controller 112 (and editor 114 when editing) as well as data structures and inline content to browser (step 1010). For instance, in the example of FIG. 8A, application site 270 may serve a data structure defining presentation controlled canvas 820 with a bar for adding text and images and a canvas area below. Inline content may be objects for the two equations. Browser 110 downloads additional slide-external assets (raster images, etc.) (step 1020). For example, in FIG. 8A, the slide-external asset may be the graphical image of the girl.

Presentation controller 112 draws object containers from data structures, incorporating style modifications from the browser if applicable. (step 1030). In FIG. 8A, for instance three object containers (for the girl and two equations) with style modifications to define border lines and an object container for the purple control bar are drawn.

Presentation controller 112 additionally provides inline content to the browser to draw it (text, SVG images, etc.)

and incorporates object-specific styles like padding and margin, etc. (step 1040). In FIG. 8A, for instance, presentation controller 112 provides the text of the two equations and the graphical image of the girl with styles that provide the white space padding and margins. Finally, the object container placement, drawing, as well as the objects themselves are drawn by the browser (for example by a renderer in browser 110) on canvas 820 based on the presentation controller rules and the browser context like viewport size, zoom, etc. (step 1050). As shown in FIG. 8A example, presentation controlled canvas 820 is then drawn with a purple color bar and the three objects (girl and two equations) based on the presentation controller 112 rules and the browser context like viewport size, zoom, etc.

Method 1000 can also operate similarly for the examples of FIGS. 4A-4B, 5A-5F, 7A, 7B and FIGS. 8B-8L as would be apparent to a person skilled in the art given this description.

Further Embodiments and Example Implementations

Aspects of the embodiments for exemplary system 200 including server 240, object server 250, and database 260 thereof may be implemented electronically using hardware, software modules, firmware, tangible computer readable or computer usable storage media having instructions stored thereon, or a combination thereof and may be implemented in one or more computer systems or other processing systems.

Embodiments may be directed to computer products comprising software stored on any computer usable medium such as memory. Such software, when executed in one or more data processing device, causes a data processing device(s) to operate as described herein.

The Brief Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described exemplary embodiments.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer-implemented system for enabling authoring of instructional content at a browser coupled over a network to an online application, comprising:
    a computer-readable memory device configured to store the browser; and
    a processor configured to execute instructions for browser operation; wherein
    the browser includes a presentation controller and an editor, wherein the presentation controller controls presentation of objects over time on a display to an author of instructional content including automatically placing objects selected at different times in successive selections by the author through a user interface of the browser onto a canvas for display within an area of the browser, and the editor allows the author to edit presentation of objects on the canvas for display within an area of the browser; and
    wherein the presentation controller when automatically placing each object of the objects on the canvas determines a size for each object based on a number of currently selected objects and content type of the currently selected objects including automatically updating determined sizes for each object in different display views of the canvas as the number of currently selected objects and the content type of the currently selected objects changes over time in the successive selections, and
    wherein the presentation controller determines a grid for the canvas having multiple regions and automatically places the objects selected at different times in successive selections by the author on the canvas in different display views according to a determined size of each object and a determined region of the grid based on the number of currently selected objects and the content type of the currently selected objects, and wherein overlap of the objects placed on the canvas is avoided in successive display views of the objects selected at the different times in the successive selections by the author through the user interface of the browser; and
    wherein the objects are included as content items in a plurality of assignment cards displayed as slides on the canvas under the control of the presentation controller and the objects in the slides can be manipulated by a user of the browser; and
    wherein the browser includes an animation controller coupled to the presentation controller, wherein the animation controller controls animation of the objects that appear in slides shown in the presentation canvas including where and when the objects appear in the slides according to a timeline; and
    an event tracker that identifies and records interactions with one or more objects as events associated with the one or more objects such that captured event data can be sent to a remote data collection service.

2. The system of claim 1, wherein the browser receives the presentation controller and the editor over the network in response to accessing the online application.

3. The system of claim 1, wherein the presentation controller in the browser automatically determines spacing between each object.

4. The system of claim 1, wherein the objects may include at least one object having text and the presentation controller automatically determines a font style and size for the text in the object.

5. The system of claim 1, wherein the objects may include at least one object having video or an image and the presentation controller in the browser automatically determines a frame size for the video or image in the object.

6. The system of claim 1, wherein the online application in communication with the browser provides a view mode and an edit mode, and wherein in the view mode, the presentation controller controls presentation of objects of instructional content, and in the edit mode the editor allows the author through the browser to edit presentation of objects by the presentation controller.

7. A computer-implemented method for enabling authoring of instructional content at a browser coupled over a network to an online application, comprising:
enabling a user to navigate the browser to a site of the application;
serving a presentation controller and an editor from the site of the application to the browser;
serving data structures and inline content from the site of the application to the browser for display in one or more slides in a presentation canvas controlled by the presentation controller;
downloading to the browser one or more additional slide-external assets;
drawing object containers from data structures under the control of the presentation controller and incorporating style modifications from the browser;
providing inline content under the control of the presentation controller to the browser and incorporating object-specific styles;
drawing on the canvas with the browser to place object containers and objects based on a grid and rules set by the presentation controller and browser context;
controlling animation of objects within one or more slides displayed on the presentation canvas within an area of the browser; and
storing audio data that can be accessed by the animation controller to provide a voice over for the animation of objects within one or more slides displayed on the presentation canvas within an area of the browser.

8. The method of claim 7, further comprising editing objects within one or more slides displayed on the presentation canvas within an area of the browser.

9. The method of claim 7, further comprising tracking events in the manipulation of objects within one or more slides displayed on the presentation canvas.

10. A computer-implemented method for enabling authoring of instructional content at a browser coupled over a network to an online application, comprising:
storing the browser in a computer-readable memory device, the browser having a presentation controller configured to control presentation of objects over time on a display to an author of instructional content and an editor configured to allow the author to edit presentation of objects on the display; and
automatically placing objects selected at different times in successive selections by the author through a user interface of the browser onto a canvas for display within an area of the browser including the following operations carried out under the control of a processor;
determining a size for each object of the objects based on the number of currently selected objects and content type of the currently selected objects including automatically updating determined sizes for each object in different display views of the canvas as a number of currently selected objects and the content type of the currently selected objects changes over time in the successive selections;
determining a grid for the canvas having multiple regions;
automatically placing the selected objects on the canvas in different display views according to a determined size of each object and a determined region of the grid based on the number of currently selected objects and the content type of the currently objects, wherein overlap of the objects placed on the canvas in the display viewable to the author is avoided in successive display views of the objects selected at the different times in the successive selections by the author through the user interface of the browser;
controlling animation of the objects that appear in slides shown in the presentation canvas including where and when the objects appear in the slides according to a timeline; and
identifying and recording interactions with one or more objects as events associated with the one or more objects such that captured event data can be sent to a remote data collection service.

\* \* \* \* \*

UNITED STATES PATENT AND TRADEMARK OFFICE
CERTIFICATE OF CORRECTION

PATENT NO. : 10,955,999 B2
APPLICATION NO. : 15/840679
DATED : March 23, 2021
INVENTOR(S) : Ian Michael Lotinsky Page 1 of 1

It is certified that error appears in the above-identified patent and that said Letters Patent is hereby corrected as shown below:

On the Title Page

Left column, Related U.S. Application Data section change:
"(66) Substitute for application No. 62/592,239, filed on Nov. 29, 2017."
To:
--(60) Provisional application No. 62/592,239, filed on Nov. 29, 2017.--

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*